US010022912B2

(12) United States Patent
Kia et al.

(10) Patent No.: US 10,022,912 B2
(45) Date of Patent: Jul. 17, 2018

(54) ADDITIVE MANUFACTURING OF A UNIBODY VEHICLE

(71) Applicant: GM Global Technology Operations LLC, Detroit, MI (US)

(72) Inventors: Hamid G. Kia, Bloomfield Hills, MI (US); Ningjian Huang, Bingham Farms, MI (US); John P. Spicer, Plymouth, MI (US); Jorge F. Arinez, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 280 days.

(21) Appl. No.: 14/940,926

(22) Filed: Nov. 13, 2015

(65) Prior Publication Data

US 2017/0136697 A1     May 18, 2017

(51) Int. Cl.
| | | |
|---|---|---|
| *B29C 67/00* | (2017.01) | |
| *B29C 64/30* | (2017.01) | |
| *B33Y 10/00* | (2015.01) | |
| *B29K 233/04* | (2006.01) | |
| *B29K 277/00* | (2006.01) | |

(Continued)

(52) U.S. Cl.
CPC .......... *B29C 67/0081* (2013.01); *B29C 64/30* (2017.08); *B33Y 10/00* (2014.12); *B29C 33/3842* (2013.01); *B29C 70/30* (2013.01); *B29C 70/545* (2013.01); *B29K 2223/0683* (2013.01); *B29K 2233/04* (2013.01); *B29K 2277/00* (2013.01); *B29K 2307/02* (2013.01); *B29K 2307/04* (2013.01);

(Continued)

(58) Field of Classification Search
CPC .............. B29C 67/0081; B29C 64/165; B29C 67/0077; B29C 67/0088; B29C 67/0055; B29K 2223/0683; B29K 2233/04; B29K 2277/00; B29K 2307/02; B29K 2307/04; B29K 2309/02; B29K 2309/08; B62D 31/003
USPC .......................................... 264/104; 425/166
See application file for complete search history.

(56) References Cited

U.S. PATENT DOCUMENTS

| | | | | |
|---|---|---|---|---|
| 2014/0328964 | A1* | 11/2014 | Mark | .................. B29C 67/0088 425/166 |
| 2015/0123419 | A1* | 5/2015 | Werum | ................ B62D 29/046 296/24.43 |

(Continued)

FOREIGN PATENT DOCUMENTS

| | | |
|---|---|---|
| CN | 102341237 A | 2/2012 |
| CN | 104229156 A | 12/2014 |

(Continued)

OTHER PUBLICATIONS

DE102014116938A1_Machine Translation (Year: 2016).*

(Continued)

*Primary Examiner* — Alison L Hindenlang
*Assistant Examiner* — Yunju Kim
(74) *Attorney, Agent, or Firm* — Harness, Dickey & Pierce, P.L.C.

(57) ABSTRACT

Methods for manufacturing structures are provided. The methods include manufacturing a shell structure by additive manufacturing methods and sectioning panels with predetermined shapes from the shell structure. The panels are subsequently coupled to shell structure. Devices for performing various steps of the methods are also provided.

20 Claims, 9 Drawing Sheets

(51) Int. Cl.
    *B29K 307/02* (2006.01)
    *B29K 307/04* (2006.01)
    *B29K 309/02* (2006.01)
    *B29K 309/08* (2006.01)
    *B29C 70/54* (2006.01)
    *B29C 33/38* (2006.01)
    *B29C 70/30* (2006.01)
    *B33Y 80/00* (2015.01)
    *B33Y 40/00* (2015.01)

(52) U.S. Cl.
    CPC ...... *B29K 2309/02* (2013.01); *B29K 2309/08* (2013.01); *B33Y 40/00* (2014.12); *B33Y 80/00* (2014.12)

(56) References Cited

U.S. PATENT DOCUMENTS

2015/0141234 A1    5/2015    Sander et al.
2017/0136698 A1    5/2017    Kia et al.
2017/0211168 A1    7/2017    Liu et al.

FOREIGN PATENT DOCUMENTS

| | | | |
|---|---|---|---|
| CN | 104245301 A | 12/2014 | |
| CN | 104379324 A | 2/2015 | |
| CN | 204399166 U | 6/2015 | |
| CN | 104972677 A | 10/2015 | |
| CN | 106696249 A | 5/2017 | |
| DE | 102014116938 A1 * | 5/2016 | ......... B29C 67/0077 |
| DE | 102016121009 A1 | 5/2017 | |

OTHER PUBLICATIONS

First Office Action and Search Report for Chinese Patent Application No. 201610974840.7 dated May 18, 2018 and correspondence from China Patent Agent (H.K.) Ltd. summarizing Office Action, 8 pages.

* cited by examiner

ADDITIVE MANUFACTURING OF A UNIBODY VEHICLE

FIELD

The present disclosure relates to the production of structures, such as unibodies or monocoques, by additive manufacturing.

BACKGROUND

This section provides background information related to the present disclosure which is not necessarily prior art.

Processes for manufacturing devices and vehicles typically rely on independently producing individual parts and piecing or assembling them together to generate a final product. For example, in the automotive industry automobiles are typically manufactured by assembling thousands of individual parts or units to form the vehicle. These parts or units are individually manufactured, often requiring use specialized or complex tools or equipment. Accordingly, the process for manufacturing automobiles is labor intensive, complex, and expensive. For example, automotive plants involve complex systems and operations, including complex tooling, material handling conveyors, stamping tools, body shops, paint shops, and the like. Furthermore, these parts and processes are largely vehicle dependent. Therefore, launching or changing over to the production of a new vehicle requires a long lead time. Accordingly, improved manufacturing methods are needed to streamline the manufacturing processes for automobiles and other vehicles or devices.

SUMMARY

This section provides a general summary of the disclosure, and is not a comprehensive disclosure of its full scope or all of its features.

The present technology provides a method for manufacturing a unitary structure. The method includes additive manufacturing a shell template of the unitary structure in a layer-by-layer printing process, wherein the shell template comprises an interior surface and an exterior surface. The method also includes applying a reinforcing material to the exterior surface of the shell template, treating the reinforcing material to generate a reinforced shell having a reinforcing composite, sectioning at least one panel with a predetermined shape out of the reinforced shell at a predetermined location, and removing the panel from the reinforced shell.

The present technology also provides another method for manufacturing a unitary structure. The method includes additive manufacturing a shell template of the unitary structure in a layer-by-layer printing process, wherein the shell template comprises an interior surface and an exterior surface. The method also includes sectioning at least one panel with a predetermined shape out of the shell template at a predetermined location, and removing the at least one panel from the shell template. The method further includes modifying the at least one panel or the reinforced shell at least one layer of material on an edge of the shell template or panel that is exposed when the panel is removed. The modifying is conducted by additive manufacturing. The method also comprises coupling the at least one panel to the shell template at the predetermined location.

Additionally, the present technology provides a method for manufacturing a unibody of a vehicle. The method includes generating a shell template via a layer-by-layer additive manufacturing process, wherein the shell template comprises an interior surface and an exterior surface. The method also includes applying a reinforcing composite material precursor to the exterior surface of the shell template comprising a resin and a plurality of fibers, and treating the reinforcing composite material precursor to generate a reinforced shell. The method further includes sectioning one or more panels with predetermined shapes out of the reinforced shell at one or more predetermined locations, removing the one or more panels from the reinforced shell, generating a frame structure about the interior surface of the reinforced shell via a layer-by-layer additive manufacturing process, and coupling the one or more panels to the reinforced shell at the corresponding one or more predetermined locations, wherein the one or more panels correspond to a vehicle component selected from the group consisting of doors, trunk lids, hoods, hatchbacks, fuel door covers, electrical outlet doors, scoops, and combinations thereof.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, disclosure of ranges includes disclosure of all values and further divided ranges within the entire range, including endpoints and sub-ranges given for the ranges. As referred to herein, ranges are, unless specified otherwise, inclusive of endpoints and include disclosure of all distinct values and further divided ranges within the entire range. Thus, for example, a range of "from A to B" or "from about A to about B" is inclusive of A and of B.

Example embodiments will now be described more fully with reference to the accompanying drawings.

In various aspects, the present disclosure provides methods manufacturing a structure. As described above, current processes for manufacturing vehicles are complex, expensive, and specialized for individual vehicles. Accordingly, the present technology provides methods for additive manufacturing of a structure's frame, housing, shell, or monocoque. These additive manufacturing methods can eliminate customized tooling for body manufacturing and ensure ultra-light-weight structures. In regard to the automotive industry, the additive manufacturing methods can also decrease lead times for launching new vehicles and for changing over to the production of a new vehicle body style, and provide an ability to build vehicle bodies and panels where they are sold. Additional advantages provided by the current technology include faster product development cycles, elimination of style-specific tooling for manufacturing a particular vehicle body, and increased manufacturing flexibility and responsiveness to customer demand.

This current technology can be used to improve the manufacture of various unitary structures. As referred to herein, a "unitary structure" is a structure having at least a portion that is constructed by additive manufacturing via layer-by-layer three dimensional printing. The unitary structures of the present technology may have one or more portions removed or added. The unitary structures can be, for example, a frame, shell, or monocoque of a vehicle or a housing of a device. Notably, while the unitary structures are particularly suitable for use in components of an automobile or other vehicles (e.g., motorcycles, boats, tractors, buses, motorcycles, mobile homes, campers, and tanks), they may also be used in a variety of other industries and applications, including aerospace components, consumer goods, office equipment and furniture, industrial equipment and machinery, farm equipment, or heavy machinery, by way of non-limiting example. Accordingly, in certain embodiments, the structure is a vehicle unibody. As used herein, a "unibody" is a single unitary structure that includes a vehicle's frame and body. Non-limiting examples of vehicles having frames or unibodies that can be manufactured by the current technology include automobiles, tractors, buses, motorcycles, boats, mobile homes, campers, and tanks. Other exemplary structures that have frames that can be manufactured by the current technology include buildings, such as houses, offices, sheds, warehouses, and devices.

The present disclosure further provides systems and devices for additive manufacturing of structures with panels. Additive manufacturing is a process by which a solid three-dimensional structure is built layer-by-layer, typically via a printing deposition process or where energy or heat is selectively applied to powder starting materials to solidify, fuse, or sinter and create a layer of solid material. Additive manufacturing is often referred to synonymously with three-dimensional printing. Either polymers or metals may be used to create solid structures via additive manufacturing. Non-limiting examples of additive manufacturing processes include fused deposition modeling and selective laser sintering with polymers, such as thermosets and thermoplastics; stereolithography, continuous liquid interface production technology, or other technologies that rely on UV curable polymers; fused deposition modeling with composite polymers; direct metal laser sintering, electron beam direct metal melting systems, blown powder directed energy deposition, wire-fed directed energy deposition, and liquid metal 3D printing system with "MagnetJet" technology with metals, such as aluminum alloys, titanium alloys, and steel alloys. Moreover, a plurality of materials may be deposited at different locations of an object being built by a single machine A digital three-dimensional modeling system can be used to create a digital model of the structure to be formed. The physical structure can then be formed from the digital model by an additive manufacturing system. The system may include scanners that survey a structure's surface and develops a three-dimensional map of the structure's surface geometry. The system also provides a plurality of heads for depositing resins and/or fibers on structure surfaces. In various embodiments, the system is provided as a plurality of devices or as a single multi-functional device.

Figure 1:
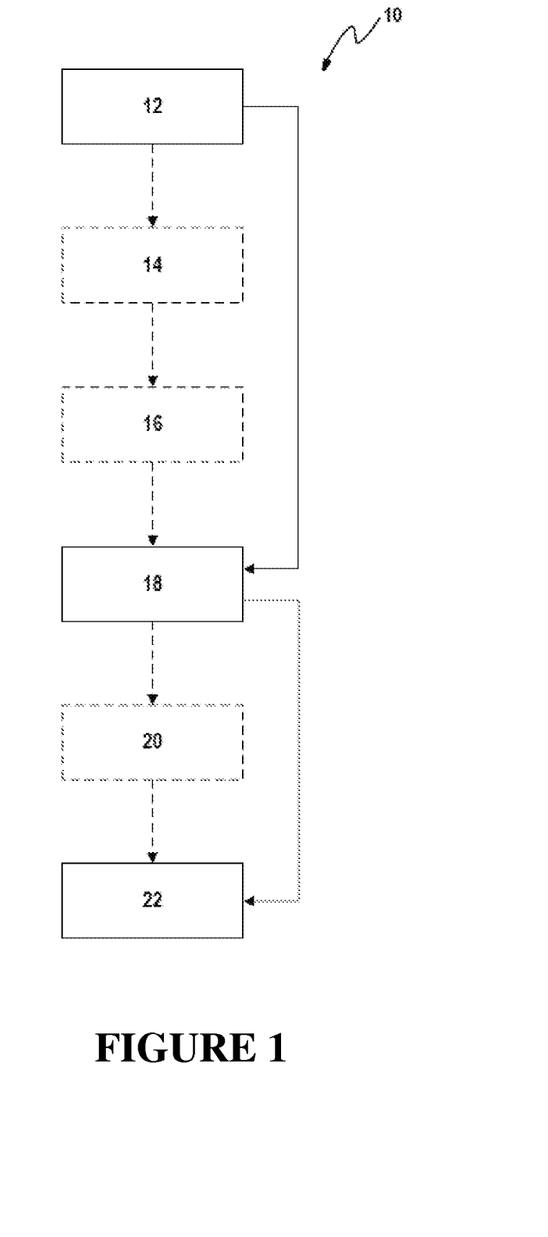
FIG. 1 is a block diagram showing a method for manufacturing a paneled structure according to certain variations of the present technology.
Figure 2:
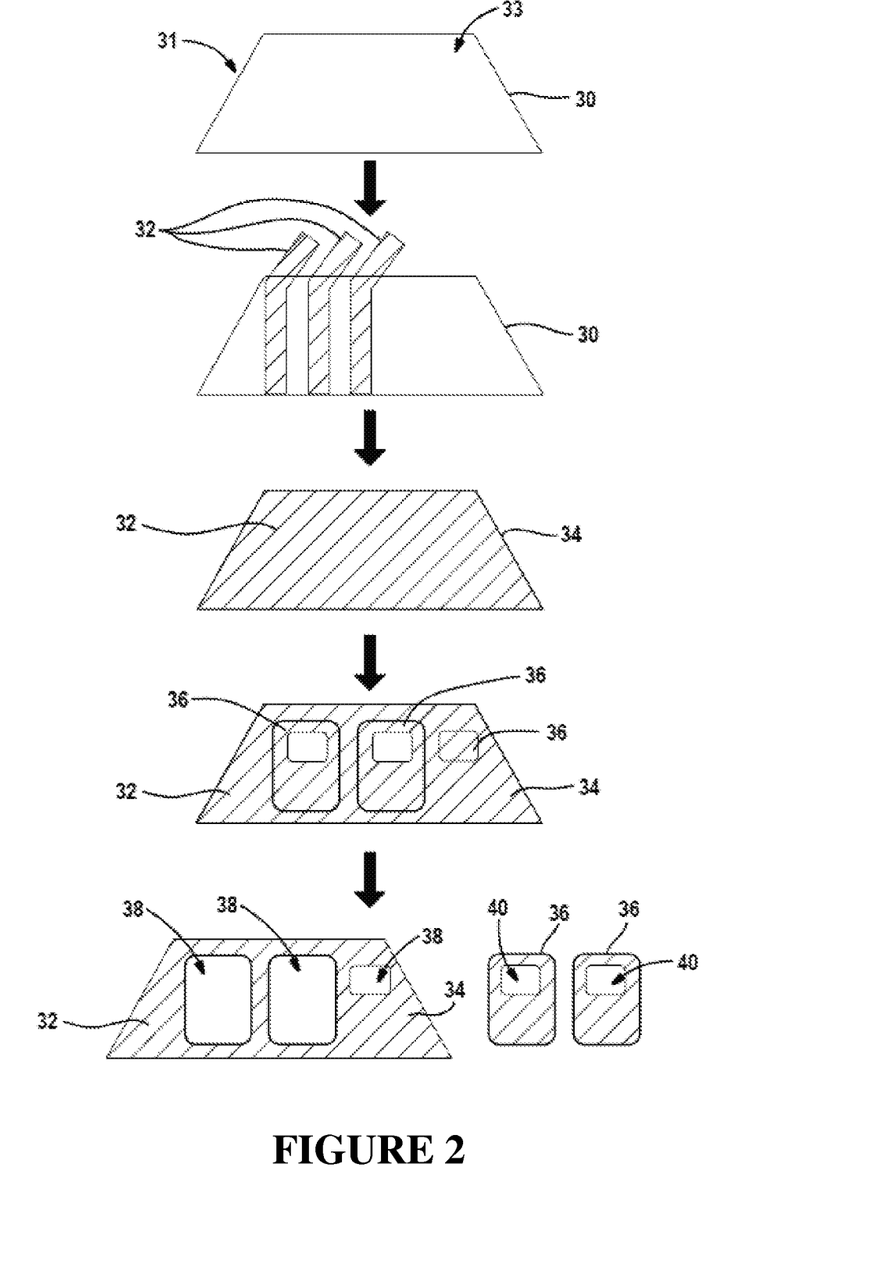
FIG. 2 is a schematic illustration of the method described in FIG. 1.

As shown in FIGS. 1 and 2, the current technology provides a method 10 for manufacturing a unitary structure. The unitary structure can be any structure as described above, including a vehicle body by way of non-limiting example. In block 12, the method includes generating a shell template of the structure. In various embodiments, the shell template forms a template for a shell that is a monocoque, which, as used herein, is an external skin or shell capable of supporting loads. An exemplary shell template 30 is shown in FIG. 2. In various embodiments, the shell template 30 has an interior surface 31 and an exterior surface 33 and is generated in layer-by-layer additive manufacturing process, also referred to herein as three-dimensional printing ("3-D printing"). In some embodiments, generating the shell template 30 by additive manufacturing comprises printing a first material and a second material, the second material being heavier than the first material. The heavier material may be situated at certain locations of the shell template 30 to generate a predetermined center of gravity. For example, a low center of gravity may help prevent tipping or improve handling when the shell is a body of a vehicle. In other variations, such a modification to the properties of the shell template 30 may include creating a solid structure with a greater density in certain areas.

The shell template 30 can be made of any material used in the art, such as, for example, a polymer, plastic, fiber glass, or metal. Non-limiting examples of suitable metals include aluminum, magnesium, stainless steel, and combinations thereof. For example, after a layer or predetermined number of layers of the material has been deposited by 3-D printing, a reinforcing composite precursor material may be applied as a layer of the template shell 30. In certain variations, the reinforcing composite precursor material is a reinforcing composite pre-preg material having reinforcing fibers. In some embodiments, the material is reinforced with a reinforcing fiber. The reinforcing material may be a reinforcing composite precursor material, such a pre-preg material. A pre-preg may be a tape or strip of material comprising a plurality of fibers distributed within a resin positioned on an exposed layer's surface. The fibers can be aligned, randomly dispersed, or geometrically dispersed as a lattice structure. Positioning the tape or resin may also be performed by 3-D printing. Therefore, printing can comprise 3-D printing the template shell 30 layer-by-layer, and three-dimensionally printing a reinforcing lattice structure as at least one of the layers. Non-limiting examples of fibers that are suitable for reinforcing the material include carbon fibers, glass fibers (such as fiber glass or quartz), aramid fibers (such as KEVLAR® para-aramid synthetic fiber and TWARON® para-aramid synthetic fiber), boron fibers, ceramic fibers, polyester fibers, ultra-high molecular weight polyethylene (UHMWPE) fibers, and combinations thereof. After the fibers are in position, 3-D printing of the template shell 30 may resume. By this method, a 3-D printed shell can comprise a plurality of reinforcement layers, which provides additional strength to the template shell 30.

Figure 3:
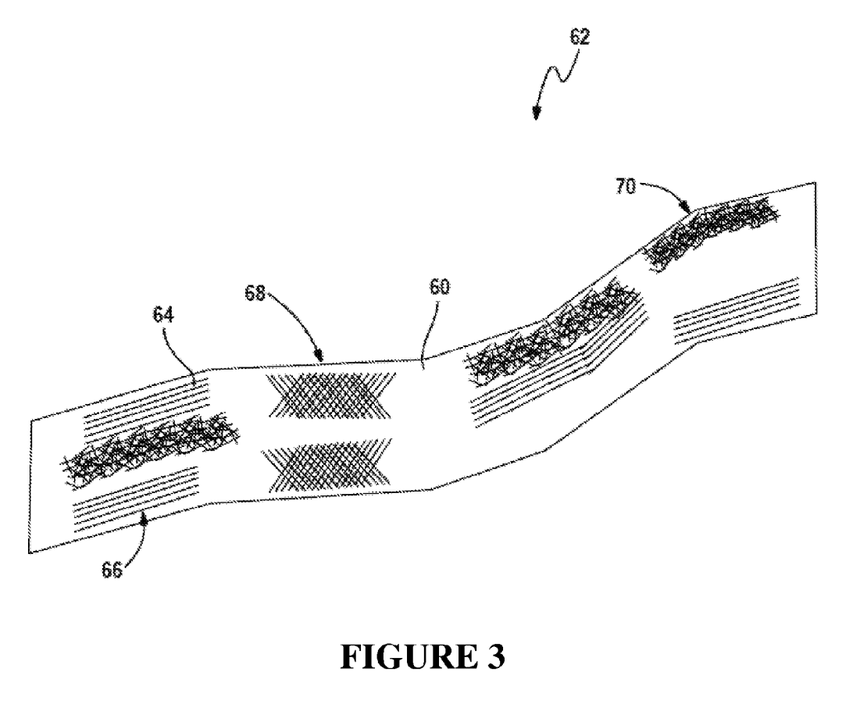
FIG. 3 is an illustration of a reinforcing composite material that includes a resin and fibers formed in accordance with certain aspects of the present technology.

In block 14 of FIG. 1, and as shown in FIG. 2, the method 10 includes optionally applying a reinforcing material 32 to the entire shell 30 or at least a portion of the shell 30, such as the exterior surface. With reference to FIG. 3, the reinforcing material 32 can be a resin 60 configured as a tape 62 that comprises reinforcing fibers 64. The reinforcing fibers 64 can include any fibers described herein. In some embodiments, the method 10 includes aligning chopped or continuous fibers 64 in a predetermined orientation, which is dependent on a location of the shell 30 to be coated. The resin 60 of FIG. 3 includes continuous fibers 64 in an aligned orientation 66, fibers 64 in a crossing orientation or weaves 68, and chopped fibers 64 in a random orientation 70. These predetermined orientations 66, 68, 70 are used to optimize the strength of the shell 30 for load or performance requirements. For example, continuous fibers 64 in an aligned orientation 66 provide strength when a load is applied to a location of the shell 30 in the direction of the fibers. In regard to a vehicle's body shell, continuous fibers 64 can be used in A-pillars (in a direction from a vehicle's front hood to the vehicle's roof) or B-pillars (in a direction from a vehicle's floor to the vehicle's roof). A crossing orientation 68 or random orientation 70 may be used in a location where it may be expected that a load will be applied orthogonal to the shell 30. Accordingly, these fiber architectures provide structures that are completely customizable. In various embodiments, the reinforcing material 32 is a pre-preg material as described above.

In box 16, after the reinforcing material 32 has been applied to the template shell 30, the method 10 includes treating the reinforcing material 32 to generate a reinforced shell 34. In various embodiments, treating includes curing or solidifying the reinforcing material 32 under pressure, wherein the pressure is associated with local vacuum bagging, hydro-static pressure, a pneumatically pressurized sleeve, or an autoclave. The resulting reinforced shell 34 has increased strength relative to the shell 30 that is not at least partially coated with a reinforcing material 32. However, in some embodiments, the template shell 30 has a sufficient strength such that coating with the reinforcing material 32 and treating the reinforcement material 32 are not necessary in boxes 14 and 16 of FIG. 1.

In box 18, the method 10 includes sectioning at least one panel or closure 36 with a predetermined shape out of the template shell 30 or reinforced shell 34 at a predetermined location. In various embodiments, a plurality of panels or closures 36 are sectioned from the template shell 30 or reinforced shell 34, such that a plurality of panels or closures 36 with individually predetermined shapes are sectioned out of the template shell 30 or reinforced shell 34 at individually predetermined locations. Sectioning is performed by any means known in the art, such as, for example, by cutting, carving, sawing, slicing, snipping, melting, etching, or a combination thereof. After sectioning, the method 10 includes removing the panel or closure 36 from the template shell 30 or reinforced shell 34. When the template shell 30 is a vehicle body, the panel or closure 36 is a vehicle part selected from the group consisting of a door, trunk lid, hood, hatchback, fuel door cover, electrical outlet door, scoop, and a combination thereof. Removing the panel or closure 36 form the template shell 30 or reinforced shell 34 exposes an opening 38 (or openings 38 when more than one panel or closure 36 is removed). In some embodiments, predetermined shapes are sectioned and removed from the panel or closure 36 as well, which exposes an opening 40 in the panel or closure 36. As discussed in more detail below, a panel or closure 36 can be assembled or coupled (such as with a hinge) to the template shell 30 or reinforced shell 34 at an opening 38 from which the panel or closure 36 was removed. In various embodiments, at least one opening 38 will allow for another component to be assembled to the template shell 30 or reinforced shell 34, such as a windshield or window. In some embodiments, the template shell 30 or reinforced shell 34 is modified to accept other components, such as locks, actuators, motors, hinges, switches, infotainment systems, speakers, seats, antennae, knobs, head lamps, tail lamps, grille/radiator ventilation, brake ventilation, a hood scoop, a sun roof, a moon roof, and/or chassis system components, such as wheels, axels, and/or a suspension system.

As the panel or closure 36 sectioned from the template shell 30 or reinforced shell 34, material is necessarily removed from the panel or closure 36 and/or the template shell 30 or reinforced shell 34. Therefore, the opening 38 is larger than the panel or closure 36 that was removed from the template shell 30 or reinforced shell 34 at the location of the opening 38. Accordingly, in box 20, the method 10 includes optionally modifying at least one of the template shell 30 or reinforced shell 34 at the location of the opening 38 or the panel or closure 36. In various embodiments, modifying comprises 3-D printing at least one layer of material on an edge of the template shell 30 reinforced shell 34, wherein the edge is exposed when the panel or closure 36 is removed. In other embodiments, modifying comprises 3-D printing at least one layer of material on an edge of the panel or closure 36, wherein the edge is exposed when the panel or closure 36 is removed from the template shell 30 or reinforced shell 34. Moreover, an edge of the panel or closure 36 that is exposed by the opening 40 can be modified in a similar fashion, for example, to adjust the size of the opening 40 such that a window or scoop can be disposed to cover the opening 40.

In some embodiments, the method 10 includes scanning the template shell 30 or the reinforced shell 34 to determine if an outer surface of the template shell 30 or the reinforced shell 34 has more than a nominal surface deviation at a location where the or closure 36 panel will be disposed. As used herein, a "nominal surface deviation" refers to a deviation of a structure's outer surface that does not affect a panel's ability to be adhered to the structure at the location of the nominal surface deviation. Accordingly, when the template shell 30 or the reinforced shell 34 has more than a nominal surface deviation, such a pit, groove, divot, or crater, a panel or closure 36 disposed at the location of the more than nominal surface deviation will not adhere to the template shell 30 or the reinforced shell 34 as well as it would if the nominal surface deviation was not present or was corrected. Similarly, when the template shell 30 or the reinforced shell 34 has more than a nominal surface deviation, such as a hill, peak, or mound, a panel or closure 36 disposed at the location of the more than nominal surface deviation will not adhere to the template shell 30 or the reinforced shell 34 in a correct orientation. Moreover, the method 10 may include scanning the template shell 30 or the reinforced shell 34 to determine how much material to 3-D print on an edge of the panel or closure 36 as described above. Therefore, scanning the template shell 30 or the reinforced shell 34 provides a three-dimensional map of the shell's 30 or the reinforced shell's 34 outer surface. In other words, scanning provides information about the surface topology of the outer surface of the template shell 30 or the reinforced shell 34. The information obtained by scanning is transferred to a 3-D printer, which enables printing of a three-dimensional engagement feature on a surface of the panel or closure 36 that contacts the surface deviation and/or the template shell 30 or reinforced shell 34 at a location where the panel or closure 36 will be disposed. The three-dimensional engagement feature is complementary to and made to conformingly contact, engage, or nest on the outer surface of the template shell 30 or reinforced shell 34.

In box 22, the method 10 includes further processing of the template shell 30, reinforced shell 34, and/or panel or closure 36. For example, at any point while the method 10 is being performed, the method can include 3-D printing a frame structure, such as a tube frame or space frame, about an interior surface of the template shell 30 or reinforced shell 34 to generate a unibody for a vehicle. In various embodiments, the frame structure includes interior structures for receiving seats, consoles, panels, instrument panels, dash boards, or other automotive features. Additionally, in some embodiments, further processing includes 3-D printing wires and/or contacts directly on the template shell 30, reinforced shell 34, and/or panels or closures 36 with an electrically conducting material, such as, for example, silver solder. Also, further processing includes applying a primer, paint, and/or a clear coat to at least one of the template shell 30, reinforced shell 34, or panel or closure 36 in some embodiments.

In various embodiments, further process includes modifying at least one panel or closure 36 and/or the template shell 30 or reinforced shell to receive at least one component selected from the group consisting of a windshield, a window, a lock, an actuator, a motor, a hinge, a switch, an infotainment system, a speaker, a seat, an antenna, a knob, a head lamp, a tail lamp, grille/radiator ventilation, brake ventilation, a hood scoop, a sun roof, a moon roof, a chassis system component, and pluralities and combinations thereof. Further processing can also include preparing at least one panel or closure 36 as a door by modifying a portion of the panels or closures 36 with components selected from the group consisting of a window, lock, actuator, motor, hinges, switches, knobs, and combinations thereof. After the panel or closure 36 is modified as a door, the method 10 may comprise coupling the panel or closure 36 to the template shell 30 or reinforced shell 34, such that the panel or closure 36 is operable to open and close at the predetermined location from where the panel or closure 36 was removed. In embodiments where a plurality of panels or closures 36 are sectioned and removed, coupling includes coupling the panels or closures 36 to the template shell 30 or reinforced shell 34 at the corresponding individually predetermined locations. Similarly, panels or closures 36 may be modified and coupled to the template shell 30 or reinforced shell 34 at the locations from where each panel or closure 36 was removed. In other words, in embodiments where the structure is a vehicle body, the plurality of panels or closures 36 are coupled to the template shell 30 or reinforced shell 34 at locations where each panel or closure 36 was removed to form vehicle parts selected from the group consisting of doors, trunk lids, hoods, hatchbacks, fuel door covers, electrical outlet doors, scoops, and combinations thereof. Such panels are each coupled to the template shell 30 or reinforced shell 34 by at least one hinge or other hardware that allows the panels to move (such as by swinging) relative to the template shell 30 or reinforced shell 34.

Figure 4:
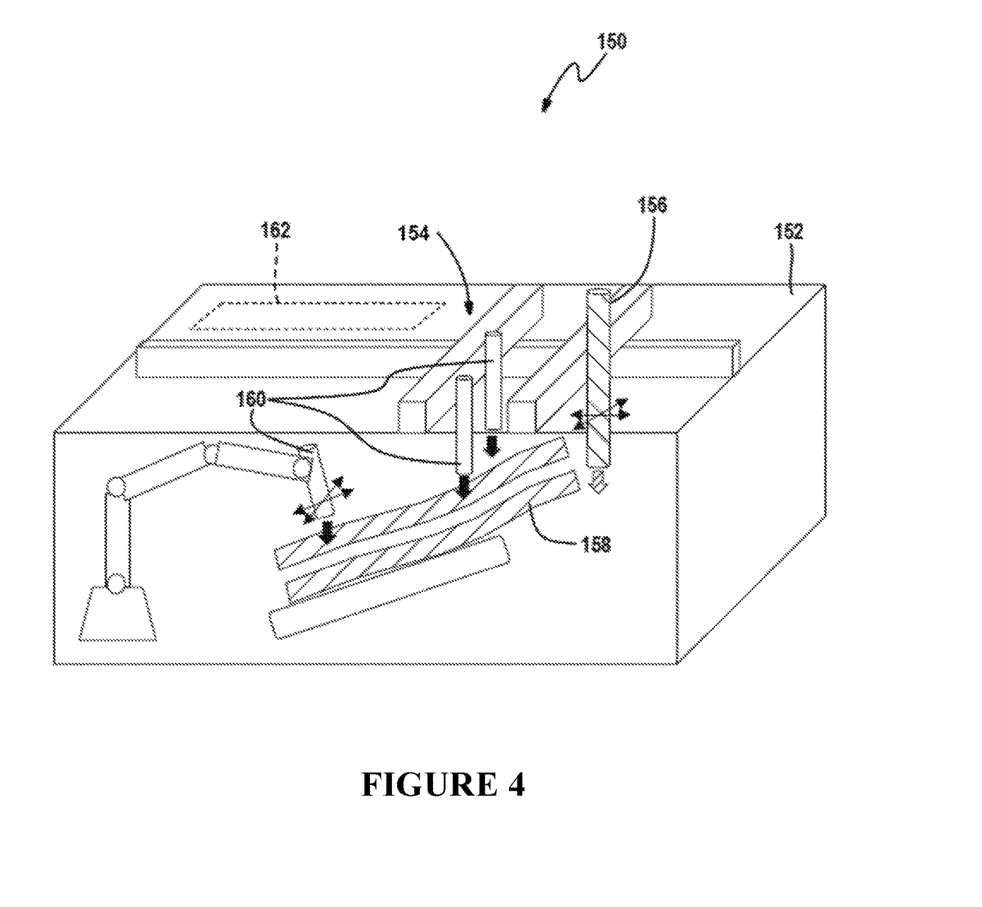
FIG. 4 is an illustration of a device for generating a reinforcing material according to certain variations of the present technology.
Figure 5:
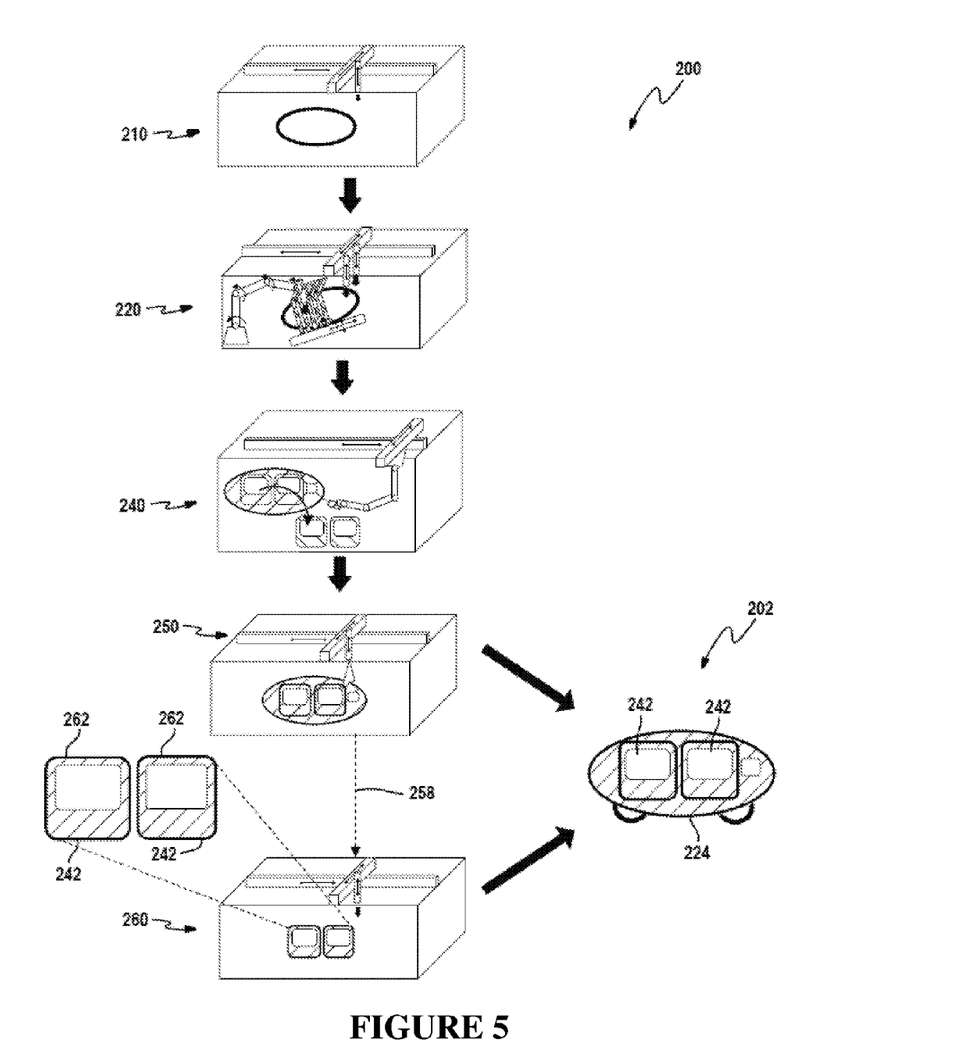
FIG. 5 is an illustration of a serial process for manufacturing a paneled structure according to certain variations of the present technology.
Figure 6:
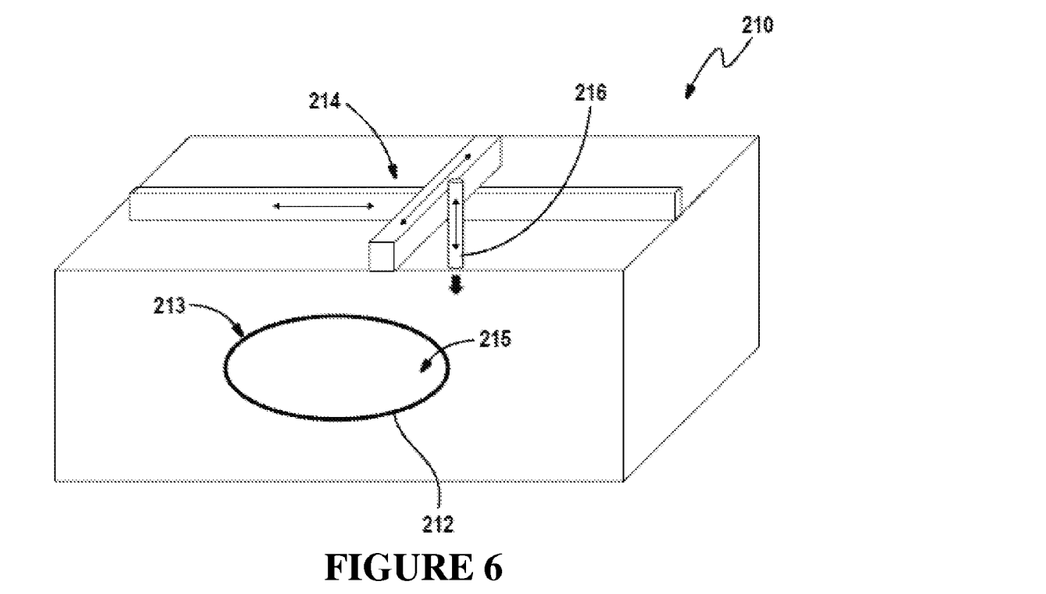
FIG. 6 is an illustration of a device for printing a shell of a structure according to certain variations of the present technology.

With reference to FIG. 4, the present technology also provides a device or system 150 for generating a reinforcing material. The device 150 includes a housing 152. Within the housing 152 is a track system 154. The device 150 also includes a printing head 156 for depositing a resin 158 in a predetermined shape and a fiber head 160 for depositing fibers onto the resin 158. The track system 154 independently moves the printing head 156 and the fiber head 160 in three dimensions. In various embodiments, the device 150 includes at least one printing head 156 and/or at least one fiber head 160. For example, the device 150 of FIG. 4 includes one printing head 156 and three fiber heads.

In some embodiments, the device 150 further comprises an optional scanning system 162 comprising stereo vision sensors and at least one camera. The scanning system 162 generates a three-dimensional map of a surface of a structure. Accordingly, the device 150 is used to scan structures, generate a map of the structure's surface, and generate a reinforcing material for coating onto the structure.

The device 150 generates custom resins comprising reinforcing fibers. Accordingly, the device 150 can be used to generate the reinforcing materials describe herein, such as the reinforcing material 32 described with reference to FIG. 3. In various embodiments, the device 150 comprises a plurality of printing heads 156. Accordingly, the device 150 can be used to perform the methods described herein. For example, the device 150 can be used to scan a shell, print a panel with a three-dimensional engagement feature, generate a reinforcing material, and coat the shell and/or panel with the reinforcing material.

With reference to FIGS. 5-10, the present technology also provides a serial process 200 for manufacturing a unitary structure 202. The unitary structure 202 can be any structure as described above. The serial process 200, for example, can be used to execute the method 10 of FIG. 1. The serial process 200 includes operating a first printing device 210, shown in greater detail in FIG. 6, for generating a template shell 212 having an interior surface 213 and an exterior surface 215 by 3-D printing. The first printing device 210 comprises a track system 214 that is operable to move a printing head 216 in three dimensions. In various embodiments, the first printing device 210 comprises at least one printing head 216, i.e., a plurality of printing heads 216. As the tack system 214 moves, the printing head 216 deposits a material such that the template shell 212 is formed. As described above, the template shell 212 can be a vehicles unibody or monocoque.

Figure 7:
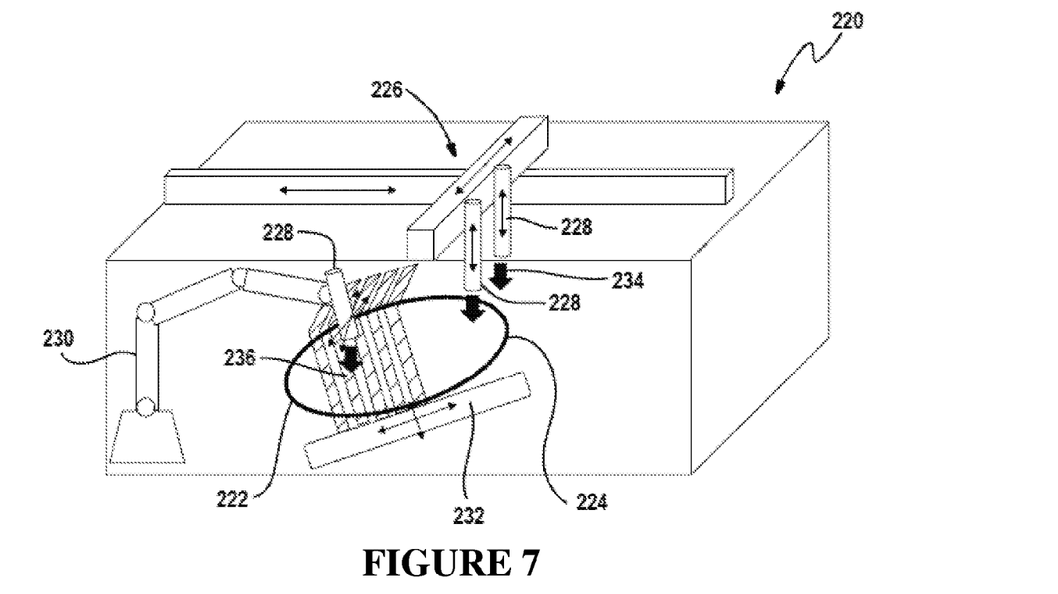
FIG. 7 is an illustration of a device for coating a shell with a reinforcing material according to certain variations of the present technology.

Unless the template shell 212 is printed with a sufficient strength, the serial process 200 then includes operating a first coating device 220, shown in greater detail in FIG. 7, for applying a reinforcing material 222 to the template shell 212 to form a reinforced shell 224. In various embodiments, applying the reinforcing material 222 to the template shell 212 includes coating at least a portion of the template shell 212, such as the exterior surface 215, with the reinforcing material 222. The first coating device 220 comprises a track system 226 that is operable to move at least one printing head 228 in three dimensions, at least one robotic arm 230 that is operable to move at least one printing head 228 in three dimensions or both the track system 226 and the at least one robotic arm 230. As shown in FIG. 7, the first coating device 220 comprises both the track system 226 and the robotic arm 230, and further comprises three printing heads 228. The first coating device 220 also comprises a multi-axis build platform or stage 232, on which the template shell 212 is positioned. The stage 232 is operable to slide and tilt in three dimensions to position the template shell 212 disposed thereon relative to the print heads 228. Accordingly, the track system 226 and robotic arm 230 can position the print heads 228 relative to the template shell 212 such that the print heads deposit a reinforcing material about the template shell 212 to form the reinforced shell 224. In some embodiments, at least one print head 228 deposits a resin 234 about the shell 112 and at least one print head 228 deposits a plurality of fibers 236 on the resin to generate the reinforcing material 222 on the template shell 212. As discussed above, the plurality of fibers 236 can be deposited on the resin 234 in a predetermined orientation depending on the location of the template shell 212 where the reinforcing material 222 is deposited. Moreover, the plurality of fibers 236 can comprise any fiber described herein.

Figure 8:
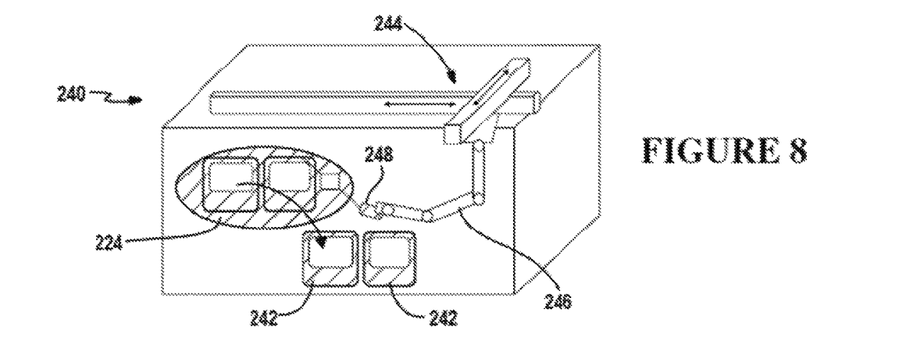
FIG. 8 is an illustration of a device for sectioning panels from a shell in accordance with certain variations of the present technology.

After the template shell 212 or reinforced shell 224 is made, the serial process 200 includes operating a sectioning device 240, shown in greater detail in FIG. 8, for sectioning at least one panel or closure 242 with a predetermined shape out of the template shell 212 or reinforced shell 224 at a predetermined location. The sectioning device 240 comprises a track system 244 that is operable to move at least one robotic arm 246 in three dimensions, at least one robotic arm 246 in three dimensions or both the track system operable to move at least one robotic arm 246 and the at least one robotic arm 246. The robotic arm 246 is operable to move at least one sectioning element 248 is three dimensions relative to the template shell 212 or reinforced shell 224. As described above, the cutting element 248 sections the template shell 212 or reinforced shell 224 by cutting, carving, sawing, slicing, snipping, melting, etching, or a combination thereof. The track system 244 and robotic arm 246 move the sectioning element 248 relative to the template shell 212 or reinforced shell 224, such that at least one panel or closure 242 is sectioned from the template shell 212 or reinforced shell 224. In some embodiments, the sectioning element 248 is a high-powered laser capable of melting the panels or closures 242 out of the template shell 212 or reinforced shell 224.

Figure 9:
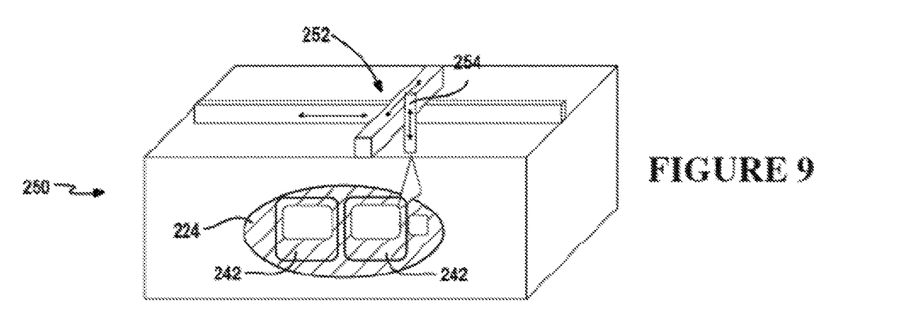
FIG. 9 is an illustration of a device for scanning a structure according to certain variations of the present technology.

The serial process 200 also includes operating a scanning device 250, shown in greater detail in FIG. 9, for scanning the template shell 212 or reinforced shell 224 to determine if an outer surface of the template shell 212 or the reinforced shell 224 has more than a nominal surface deviation at a location where the panel or closure 242 will be disposed. Scanning may also be performed to determine how much material to 3-D print on an edge of the panel or closure 242 as described above. The scanning device 250 comprises a track system 252 that is operable to move at least one scanner 254 in three dimensions relative to the template shell 212 or reinforced shell 224 to survey the shell's 212 or reinforced shell's 224 surface and develop a three-dimensional map of its surface geometry. The scanner 254 comprises at least one sensor and optionally at least one camera. Non-limiting examples of sensors include a stereo vision sensor, a laser triangulation sensor employing a point laser or line laser, or a mechanical touch probe sensor, such as a coordinate measurement machine (CMM). The sensor is configured to capture three-dimensional point cloud data for developing the three-dimensional map.

Figure 10:
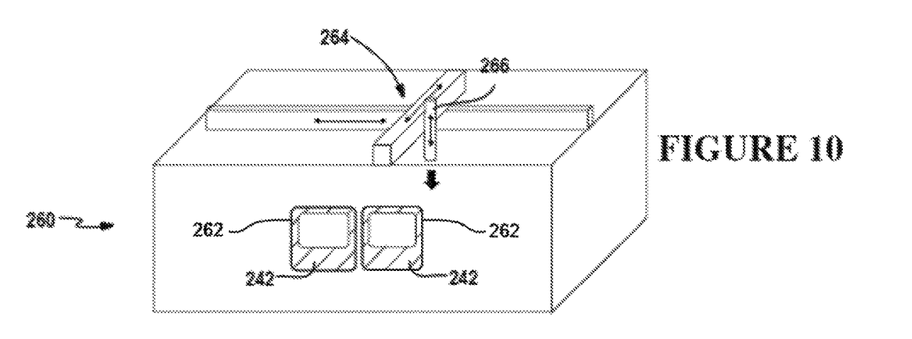
FIG. 10 is an illustration of a device for modifying panels in accordance with certain variations of the present technology.

After scanning, the serial process 200 includes operating a second printing device 260, shown in greater detail in FIG. 10, for modifying a surface of the template shell 212 or reinforced shell 224 with an engagement surface at a location where a panel or closure 242 will be disposed. In particular, a data transfer module or device 258 transfers data from the scanning device 250 to the second printing device 260 such that a surface printed onto the template shell 212, reinforced shell 224, or panel or closure 242 will provide an engagement surface that is complimentary to the surface deviation of the reinforced shell 224. As shown in FIG. 10, a surface 262 is printed on the panel or closure 242 to increase the size of the panel or closure 242 such that it will fit in a predetermined manner in an opening in the template shell 212 or reinforced shell 224. The second printing device 260 comprises a track system 264 that is operable to move at least one printing head 266 in three dimensions to print the engagement surface. In various embodiments, the second printing device 260 can accommodate a plurality of panels or closures 242 and print surfaces 262 on the plurality of preformed panels or closures 242. In some embodiments, the second printing device 260 and the first printing device 210 are the same device.

After operating the second printing device 260, the panels or closures 242 are coupled to the template shell 212 or reinforced shell 224, such as, for example, with a hinge, and/or further processing is performed as described above.

Various components of the devices 210, 220, 240, 250, 260 described in regard to the serial process 200 may be combined into multifunctional devices. The multifunctional devices occupy less space than the collective devices 210, 220, 240, 250, 260 and generate structures in less time relative to the time required to make the structures with the individual devices 210, 220, 240, 250, 260. These multifunctional devices are described in more detail below in regard to parallel process for manufacturing a paneled structure. However, it is understood that any combination of these devices may be employed in a single device, such that the description below is not limiting.

Figure 11:
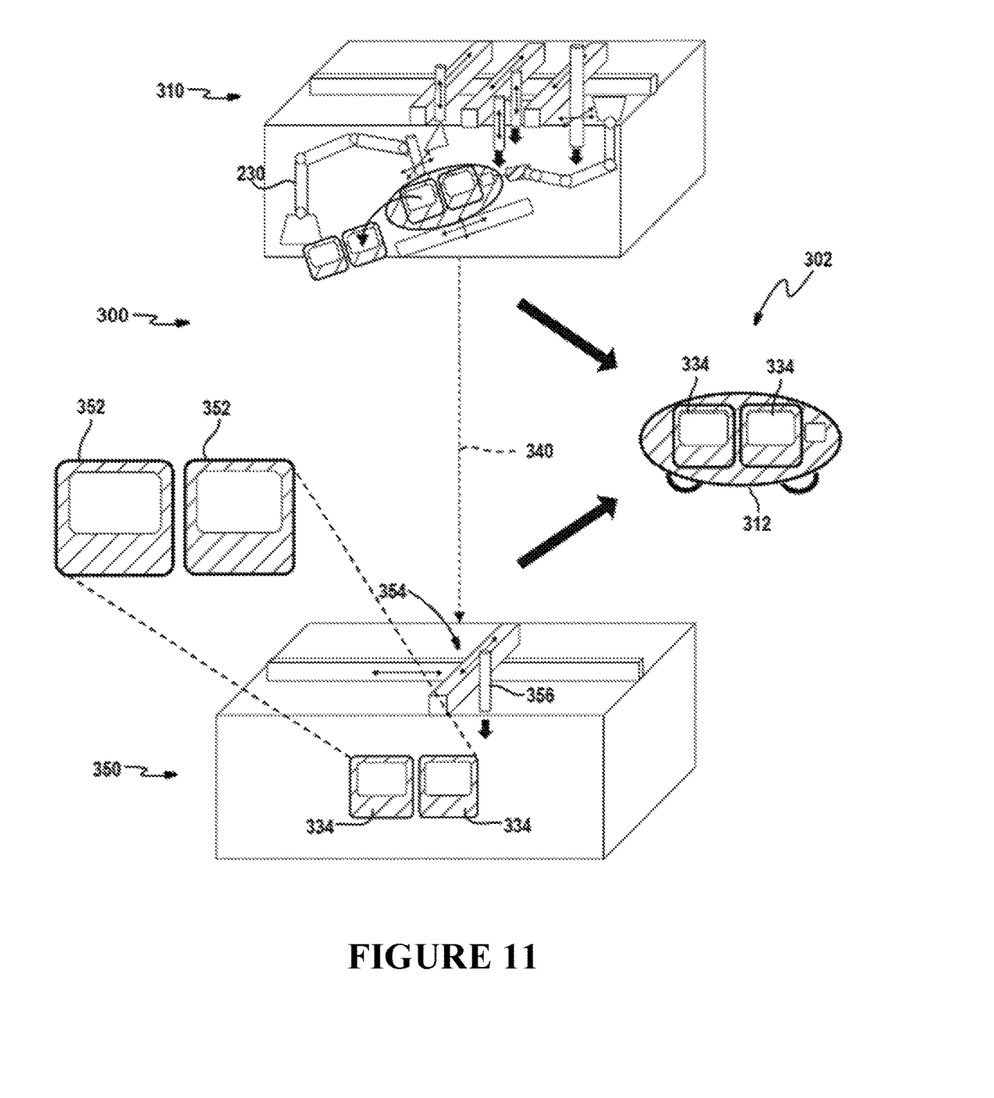
FIG. 11 is an illustration of a parallel process for manufacturing a paneled structure according to certain variations of the present technology.
Figure 12:
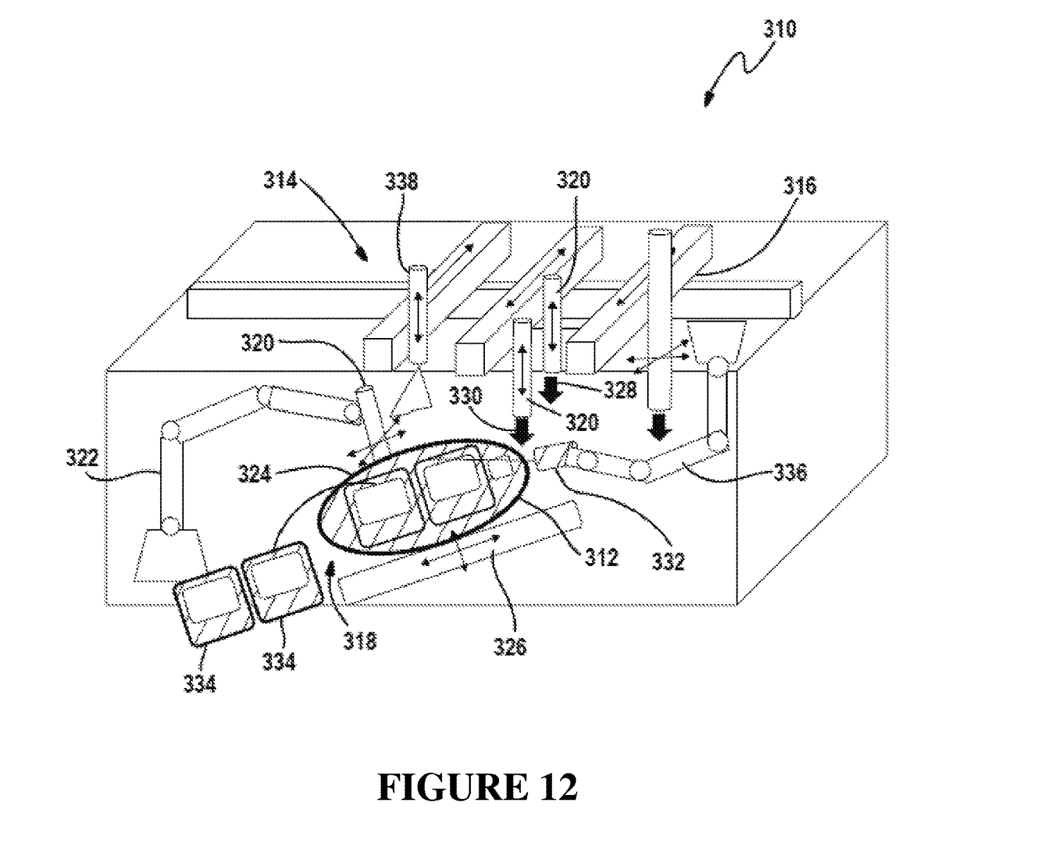
FIG. 12 is an illustration of a device for printing a shell, coating the shell with a reinforcement material, sectioning panels from the shell, and scanning the shell in accordance with certain variations of the present technology.

With reference to FIGS. 11-12, the present technology also provides a parallel process, or "all-in-one" process 300 for manufacturing a structure 302. The serial process 300, for example, can be used to execute the method 10 of FIG. 1. The serial process 300 includes operating a first manufacturing device 310, shown in greater detail in FIG. 12, for generating a reinforced shell 312 with an interior surface and an exterior surface. The first manufacturing device 310 comprises a track system 314 that is operable to move a printing head 316 in three dimensions. In various embodiments, the first manufacturing device 310 comprises at least one printing head 316 or a plurality of printing heads 316. As the tack system 314 moves, the printing head 316 deposits a material such that a shell 318 is formed. As described above, the shell 318 can be a vehicular body such as a unibody or monocoque.

The first manufacturing device 310 also comprises at least one coat printing head 320 associated with the track system 314 that is capable of moving the coat printing head 320 in three dimensions, at least one robotic arm 322 that is operable to move at least one coat printing head 320 in three dimensions, or both the coat printing head 320 associated with the track system 314 and the coat printing head 320 associated with the robotic arm 322. The coat printing head 320 coats the at least a portion of the shell 318, such as the exterior surface, with a reinforcing material 324 to form the reinforced shell 312. However, it is understood that the shell 318 does not need to be coated with the reinforcing material 324 if the shell 318 is printed with a sufficient strength.

The first manufacturing device 310 also comprises a multi-axis build platform or stage 326, on which the shell 318 is printed and positioned. The stage 326 is operable to slide and tilt in three dimensions to position the shell 318 disposed thereon relative to the coat print heads 320. Accordingly, the track system 314 and robotic arm 322 can position the print heads 320 relative to the shell 318 such that the coat print heads 320 deposit the reinforcing material 324 about the shell 318 to form the reinforced shell 312. In some embodiments, at least one coat print head 320 deposits a resin 328 about the shell 318 and at least one print head 320 deposits a plurality of fibers 330 on the resin 328 to generate the reinforcing material 324 on the shell 318. As discussed above, the plurality of fibers 330 can be deposited on the resin 328 in a predetermined orientation depending on the location of the shell 318 where the reinforcing material 324 is deposited. Moreover, the plurality of fibers 330 can comprise any fiber described herein.

The first manufacturing device 310 also comprises at least one sectioning element 332 for sectioning at least one panel or closure 334 with a predetermined shape out of the shell 318 or reinforced shell 312 at a predetermined location. The sectioning element 332 is associated with the track system 314 that is operable to move at least one robotic arm 336 in three dimensions, at least one robotic arm 336 in three dimensions or both the track system 314 operable to move at least one robotic arm 336 and the at least one robotic arm 336. The robotic arm 336 is operable to move the at least one sectioning element 332 in three dimensions relative to the shell 318 or reinforced shell 312. As described above, the cutting element 332 sections the shell 318 or reinforced shell 312 by cutting, carving, sawing, slicing, snipping, melting, etching, or a combination thereof. The track system 314 and robotic arm 336 move the sectioning element 332 relative to the shell 318 or reinforced shell 312, such that at least one panel or closure 334 is sectioned from the shell 318 or reinforced shell 312. In some embodiments, the sectioning element 332 is a high-powered laser capable of melting the panels or closures 334 out of the shell 318 or reinforced shell 312.

The first manufacturing device 310 may also comprises at least one scanner 338 for scanning the shell 318, reinforced shell 312, or panel or closure 334 to determine if the shell 318 or reinforced shell 312 has an outer surface with more than a nominal surface deviation at a location where a panel or closure will be disposed. The at least one scanner 338 is associated with the track system 314, which is operable to move the at least one scanner 338 in three dimensions relative to the shell 318 or reinforced shell 312 to survey the shell's 318 or reinforced shells 312 surface and develop a three-dimensional map of its surface geometry. The at least one scanner 338 comprises at least one sensor and optionally at least one camera. Non-limiting examples of sensors include a stereo vision sensor, a laser triangulation sensor employing a point laser or line laser, or a mechanical touch probe sensor, such as a coordinate measurement machine (CMM). The sensor is configured to capture three-dimensional point cloud data for developing the three-dimensional map.

After scanning, the parallel process 300 includes operating a second manufacturing device 350 for modifying a surface of the shell 318 or reinforced shell 312 with an engagement surface at a location where a panel or closure 334 will be disposed. In particular, a data transfer module or device 340 transfers data from the scanner 338 to the second manufacturing device 350 such that a surface printed onto the shell 318, reinforced shell 312, or panel or closure 334 will provide an engagement surface that is complimentary to the surface deviation of the shell 318 or reinforced shell 312. As shown in FIG. 11, a surface 352 is printed on the panel or closure 334 to increase the size of the panel or closure 334 such that it will fit in a predetermined manner in an opening in the shell 318 or reinforced shell 312. The second manufacturing device 350 comprises a track system 354 that is operable to move at least one printing head 356 in three dimensions to print the engagement surface. In various embodiments, the second manufacturing device 350 can accommodate a plurality of panels or closures 334 and print surfaces 352 on the plurality of preformed panels 334. In some embodiments, the second manufacturing device 350 and the first manufacturing device 310 are the same device.

After operating the second manufacturing device 350, the panels or closures 334 are coupled to the shell 318 or reinforced shell 312, such as, for example, with a hinge, and/or further processing is performed as described above.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for manufacturing a unitary structure, the method comprising:
    additive manufacturing a shell template of the unitary structure in a layer-by-layer printing process, wherein the shell template comprises an interior surface and an exterior surface;
    applying a reinforcing material to the exterior surface of the shell template;
    treating the reinforcing material to generate a reinforced shell comprising a reinforcing composite;
    sectioning at least one panel with a predetermined shape out of the reinforced shell at a predetermined location;
    removing the panel from the reinforced shell; and
    coupling the panel to the reinforced shell such that the panel is operable to open and close at the predetermined location from where the panel was removed from the reinforced shell.

2. The method according to claim 1, wherein the sectioning of the at least one panel comprises at least one of cutting, carving, sawing, slicing, snipping, melting, or etching a panel with a predetermined shape out of the shell template at the predetermined location.

3. The method according to claim 1, wherein the unitary structure is a vehicle body and a plurality of panels are sectioned, removed from, and coupled to the reinforced shell to form vehicle parts selected from the group consisting of doors, trunk lids, hoods, hatchbacks, fuel door covers, electrical outlet doors, scoops, and combinations thereof.

4. The method according to claim 1, further comprising: modifying at least one of the shell template at the predetermined location and the panel.

5. The method according to claim 4, wherein the modifying comprises additive manufacturing at least one layer of material on an edge of the reinforced shell that is exposed when the panel is removed.

6. The method according to claim 5, wherein the unitary structure is a vehicle body and the modifying of the panel comprises removing a portion of the panel at a location where a window is to be disposed.

7. The method according to claim 1, further comprising: applying a clear coat or paint to at least one of the reinforced shell or panel.

8. The method according to claim 1, wherein the applying of the reinforcing material is done by applying a reinforcing composite pre-preg material having reinforcing fibers selected from the group consisting of carbon fibers, glass fibers, aramid fibers, boron fibers, ceramic fibers, polyester fibers, ultra-high molecular weight polyethylene (UHMWPE) fibers, and combinations thereof.

9. The method according to claim 8, wherein the applying of the reinforcing material to the exterior surface of the shell template comprises aligning the reinforcing fibers in a predetermined orientation.

10. The method according to claim 1, wherein the treating comprises curing or solidifying a resin in the reinforcing material or the shell template.

11. The method according to claim 1, further comprising: additive manufacturing a frame structure within the interior surface of the shell template to generate a unibody for a vehicle.

12. The method according to claim 1, wherein the additive manufacturing the shell template comprises additive manufacturing a shell template composed of a metal, a polymer, or both a metal and a polymer.

13. A method for manufacturing a unitary structure, the method comprising:
    additive manufacturing a shell template of the unitary structure in a layer-by-layer printing process, wherein the shell template comprises an interior surface and an exterior surface;
    sectioning at least one panel with a predetermined shape out of the shell template at a predetermined location;
    removing the at least one panel from the shell template;

modifying the at least one panel or the shell template by creating at least one layer of material on an edge of the shell template or panel that is exposed when the panel is removed via additive manufacturing; and coupling the at least one panel to the shell template at the predetermined location.

14. The method according to claim 13, further comprising:

applying a reinforcing material to the exterior surface of the shell template; and treating the reinforcing material to generate a reinforced shell, wherein applying and treating are performed prior to the sectioning.

15. A method for manufacturing a unibody of a vehicle; the method comprising:

generating a shell template via a layer-by-layer additive manufacturing process, wherein the shell template comprises an interior surface and an exterior surface;

applying a reinforcing composite material precursor to the exterior surface of the shell template comprising a resin and a plurality of fibers;

treating the reinforcing composite material precursor to generate a reinforced shell;

sectioning one or more panels with predetermined shapes out of the reinforced shell at one or more predetermined locations;

removing the one or more panels from the reinforced shell;

generating a frame structure about the interior surface of the reinforced shell via a layer-by-layer additive manufacturing process; and coupling the one or more panels to the reinforced shell at the corresponding one or more predetermined locations, wherein the one or more panels correspond to a vehicle component selected from the group consisting of doors, trunk lids, hoods, hatchbacks, fuel door covers, electrical outlet doors, scoops, and combinations thereof.

16. The method according to claim 15, further comprising printing at least one of wires and electrical contacts directly on at least one of the reinforced shell and the one or more panels with an electrically conducting material.

17. The method according to claim 15, further comprising:

prior to coupling the one or more panels to the reinforced shell, preparing a portion of the panels as doors by modifying the portion of panels with components selected from the group consisting of a window, lock, actuator, motor, hinges, switches, knobs, and combinations thereof.

18. The method according to claim 15, wherein the generating the shell template further comprises printing a layer comprising a reinforcing lattice structure to define one of the layers forming the shell template.

19. The method according to claim 15, wherein the applying of the reinforcing composite precursor material is done by applying a reinforcing composite pre-preg material having reinforcing fibers selected from the group consisting of carbon fibers, glass fibers, aramid fibers, boron fibers, ceramic fibers, polyester fibers, ultra-high molecular weight polyethylene (UHMWPE) fibers, and combinations thereof.

20. The method according to claim 15, wherein the generating the shell template via the layer-by-layer additive manufacturing process comprises printing a first material and a second material, wherein the second material is heavier than the first material and positioned at predetermined locations to create a predetermined center of gravity.

* * * * *